United States Patent
Lin

(10) Patent No.: US 11,902,836 B2
(45) Date of Patent: Feb. 13, 2024

(54) UPLINK TRANSMISSION METHOD, APPARATUS, TERMINAL DEVICE, ACCESS NETWORK DEVICE AND SYSTEM

(71) Applicant: Guangdong OPPO Mobile Telecommunications Corp., Ltd., Guangdong (CN)

(72) Inventor: Yanan Lin, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 16/493,287

(22) PCT Filed: Mar. 17, 2017

(86) PCT No.: PCT/CN2017/077143
§ 371 (c)(1),
(2) Date: Sep. 11, 2019

(87) PCT Pub. No.: WO2018/165987
PCT Pub. Date: Sep. 20, 2018

(65) Prior Publication Data
US 2020/0008103 A1 Jan. 2, 2020

(51) Int. Cl.
*H04L 5/00* (2006.01)
*H04W 72/21* (2023.01)
(Continued)

(52) U.S. Cl.
CPC .......... *H04W 28/20* (2013.01); *H04L 5/0007* (2013.01); *H04W 72/21* (2023.01); *H04W 76/27* (2018.02)

(58) Field of Classification Search
CPC . H04W 28/20; H04W 76/27; H04W 72/0413; H04W 72/0446; H04W 72/0453;
(Continued)

(56) References Cited

U.S. PATENT DOCUMENTS 9,854,569 B2 * 12/2017 Yang ................. H04W 16/14
10,333,674 B2 * 6/2019 Kwak ................. H04L 5/0053
(Continued)

FOREIGN PATENT DOCUMENTS

CN 102362536 A 2/2012
CN 102412880 A 4/2012
(Continued)

OTHER PUBLICATIONS

Mathworks, "Resource Element Groups (REGs)—MATLAB & Simulink," https://www.mathworks.com/help/lte/ug/resource-element-groups-regs-1.html#bt09fji, May 24, 2016 (Year: 2016).*
(Continued)

*Primary Examiner* — Un C Cho
*Assistant Examiner* — Lalita W Pace
(74) *Attorney, Agent, or Firm* — Young Basile Hanlon & MacFarlane, P.C.

(57) ABSTRACT

An uplink transmission method, an apparatus, a terminal device, access network device, and system are provided. The method includes: a terminal device determines at least two resource sets, wherein frequency domain positions of at least two resource elements in resource elements in each resource set of the at least two resource sets are different; the terminal device receives configuration signaling sent by access network device; the terminal device determines one or more resource sets of a first category and one or more resource sets of a second category in the at least two resource sets according to configuration signaling, wherein the resource set of the first category is used for transmitting uplink control information in uplink control channel, and the resource set of the second category is used for transmitting an uplink reference signal in the uplink control channel; and the terminal device sends the uplink control channel.

18 Claims, 10 Drawing Sheets

(51) Int. Cl.
*H04W 28/20* (2009.01)
*H04W 76/27* (2018.01)

(58) Field of Classification Search
CPC . H04W 72/0493; H04W 72/04; H04W 72/21; H04L 5/0007; H04L 5/0055; H04L 5/0048; H04L 5/0091; H04L 5/0053
See application file for complete search history.

(56) References Cited

U.S. PATENT DOCUMENTS

| | | | |
|---|---|---|---|
| 2010/0272019 A1 | 10/2010 | Papasakellariou et al. | |
| 2012/0046032 A1 | 2/2012 | Baldemair et al. | |
| 2015/0236826 A1* | 8/2015 | Liu | H04L 5/0035 370/329 |
| 2016/0360518 A1* | 12/2016 | Noh | H04L 27/2607 |
| 2018/0192416 A1* | 7/2018 | Yin | H04L 5/0094 |
| 2018/0331807 A1* | 11/2018 | Kim | H04L 29/06 |
| 2019/0045536 A1* | 2/2019 | Gao | H04W 72/0446 |
| 2019/0158329 A1* | 5/2019 | Hwang | H04L 5/0053 |
| 2019/0215824 A1* | 7/2019 | Takeda | H04L 5/0007 |
| 2019/0335449 A1* | 10/2019 | Xiong | H04L 1/1671 |
| 2020/0015225 A1* | 1/2020 | Matsumura | H04L 27/2607 |
| 2020/0068556 A1* | 2/2020 | Tiirola | H04L 5/0053 |
| 2020/0195387 A1* | 6/2020 | Matsumura | H04L 1/1854 |

FOREIGN PATENT DOCUMENTS

| | | | | |
|---|---|---|---|---|
| CN | 103427940 | A | 12/2013 | |
| CN | 104081704 | A | 10/2014 | |
| CN | 104125040 | A | 10/2014 | |
| CN | 104871619 | A | 8/2015 | |
| CN | 105722229 | A | 6/2016 | |
| EP | 2900027 | A1 | 7/2015 | |
| EP | 3396887 | A1 | 10/2018 | |
| WO | 2009019878 | A1 | 2/2009 | |
| WO | 2016093600 | A1 | 6/2016 | |
| WO | 2016130896 | A1 | 8/2016 | |
| WO | 2016138646 | A1 | 9/2016 | |
| WO | 2017019132 | A1 | 2/2017 | |
| WO | WO-2017177443 | A1 * | 10/2017 | ............. H04L 29/08 |
| WO | 2018084661 | A1 | 5/2018 | |
| WO | 2018129085 | A1 | 7/2018 | |
| WO | 2018144470 | A1 | 8/2018 | |

OTHER PUBLICATIONS

Extended EP Search Report for EP Application No. 17901279.4 dated Jan. 31, 2020.
3GPP TSG RAN WG1 NR-AdHoc Meeting; R1-1700502; Spokane, USA, Jan. 16-20, 2017.
LG Electronics, "Design of One-symbol NR-PUCCH Format", 3GPP TSG RAN WG1 NR-AdHoc Meeting R1-1700503, Jan. 20, 2017 (Jan. 20, 2017), pp. 1-4.
Intel Corporation, "Resource Allocation for NR Uplink Control Channel", 3GPP TSG RAN WG1 NR-AdHoc Meeting R1-1700369, Jan. 20, 2017 (Jan. 20, 2017), pp. 1-4.
Singapore First Office Action for SG Application 11201908421P dated Nov. 17, 2020.
Canada First Office Action for CA Application 3,056,266 dated Oct. 23, 2020.
Communication pursuant to Article 94(3) EPC Examination for EP Application 17901279.4 dated Oct. 16, 2020.
China First Office Action with English Translation for CN Application 201911303690.7 dated Nov. 3, 2020.
English Translation Chile First Office Action dated Sep. 17, 2020.
3GPP TSG RAN WG1 Meeting; #88 R1-172481; Athens, Greece Feb. 13-17, 2017—Design of long NR-PUCCH format.
3GPP TSG RAN WG1 #88; R1-1703758 Athens, Greece; Feb. 13-17, 2017—WF on PUCCH Structure.
English Translation Russian Grant Decision dated Jun. 29, 2020.
Indian First Examination Report for Application No. 20917037965 dated Jan. 27, 2021.
Chile Examination Report with English Translation for Application No. 2019-002598 dated Jan. 18, 2021.
European Examination Report for Application No. 179012794 dated Mar. 1, 2021.
Korean Office Action with English Translation for Application No. 10-2019-7026872 dated Jan. 15, 2021.
LG Electronics, Design of short NR-PUCCH format, 3GPP TSG RAN WG1 Meeting #88, R1-1702479, Feb. 13-17, 2017. (7 pages).
Canadian Office Action for CA Application 3056266 dated Jul. 16, 2021. (3 pages).
Japanese Office Action with English Translation for JP Application 2019-549524 dated May 28, 2021. (10 pages).
Korean Office Action with English Translation for KR Application 10-2019-7026872 dated Jul. 21, 2021. (8 pages).
Taiwan Office Action with English Translation for TW Application 107105083 dated May 17, 2021. (9 pages).
Korean Notice of Final Rejection with English Translation for KR Application 1020197026872 dated Sep. 6, 2021. (8 pages).
Korean Notification of Reason for Refusal with English Translation for KR Application 1020217031593 dated Nov. 17, 2021. (9 pages).
Taiwan Office Action with English Translation for TW Application 107105083 dated Sep. 27, 2021. (7 pages).
Indonesia Office Action with English Translation for ID Application P00201909137 dated Nov. 8, 2021. (10 pages).
Australian First Examination Report for AU Application 2017403798 dated Dec. 10, 2021. (4 pages).
Extended European Search Report for EP Application 21195728.7 dated Jan. 26, 2022. (8 pages).
Israel First Examination Report with English Translation for IL Application 269359 dated Dec. 5, 2021. (4 pages).
Korean Office Action with English Translation for KR Application 1020217031593 dated Apr. 5, 2022. (8 pages).
China First Office Action with English Translation for CN Application 201780088392.3 dated Jul. 26, 2023. (19 pages).

* cited by examiner

UPLINK TRANSMISSION METHOD, APPARATUS, TERMINAL DEVICE, ACCESS NETWORK DEVICE AND SYSTEM

CROSS-REFERENCE TO RELATED APPLICATION(S)

This application is a 371 application of International Application No. PCT/CN2017/077143, filed on Mar. 17, 2017, the entire disclosure of which is hereby incorporated by reference.

TECHNICAL FIELD

Implementations of the present application relate to the field of communications, in particular to an uplink transmission method, an apparatus, a terminal device, an access network device and a system.

BACKGROUND

In Long-Term Evolution (LTE), a Physical Uplink Control Channel (PUCCH) is used for carrying Uplink Control Information (UCI) sent from a user equipment (UE) to an evolved base station (eNodeB, eNB). The UCI includes an acknowledgement (ACK) and a negative-acknowledgement (NACK) for feedback of Physical Downlink Shared Channel (PDSCH) transmission, and Channel-State Information (CSI), etc.

A conventional PUCCH is transmitted in a Physical Resource Block (PRB) allocated at an edge of a system bandwidth, occupying 12 subcarriers in frequency domain and 7 symbols in time domain. However, in a 5th generation (5G) New Radio (NR) system, PUCCHs of two time lengths, namely short-PUCCH and long-PUCCH, are simultaneously supported to meet new design requirements of low delay and fast feedback. The short-PUCCH includes 1 or 2 time-domain symbols, and the long-PUCCH includes at least 4 time domain symbols. Currently, there is no solution for transmission design of a Reference Signal (RS) and UCI in the short-PUCCH.

SUMMARY

Implementations of the present application provide an uplink transmission method, an apparatus, a terminal device, an access network device and a system. The technical solution is as follows.

According to a first aspect of an implementation of the present application, an uplink transmission method is provided. The method includes: a terminal device determines at least two resource sets, wherein frequency domain positions of at least two resource elements in resource elements in each resource set of the at least two resource sets are different; the terminal device receives a configuration signaling sent by an access network device; the terminal device determines a resource set of a first category in the at least two resource sets according to the configuration signaling, wherein the resource set of the first category is used for transmitting uplink control information (UCI) in an uplink control channel; and the terminal device sends the uplink control channel.

In an optional implementation, the method further includes: the terminal device determines a resource set of a second category in the at least two resource sets according to the configuration signaling, wherein the resource set of the second category is used for transmitting an uplink reference signal in the uplink control channel.

In an optional implementation, a length Q of a reference signal sequence used for the uplink reference signal is equal to a quantity of resource elements in one resource set of the second category corresponding to the uplink reference signal; or, a length Q of the reference signal sequence used for the uplink reference signal is equal to a quantity of resource elements in a single resource block in one resource set of the second category corresponding to the uplink reference signal.

In an optional implementation, a quantity of resource elements included in the each resource set of the at least two resource sets is same.

In an optional implementation, resource elements in the each resource set of the at least two resource sets belong to one time domain unit in time domain.

In an optional implementation, resource elements in the each resource set of the at least two resource sets belong to one resource block in frequency domain.

In an optional implementation, resource elements in the each resource set of the at least two resource sets belong to a plurality of resource blocks in frequency domain, and the uplink control channel is transmitted through the plurality of resource blocks.

In an optional implementation, resource elements belonging to one time domain unit in the each resource set of the at least two resource sets are distributed with an equal interval in frequency domain.

In an optional implementation, the at least two resource sets are indexed according to an order of firstly frequency domain and then time domain; or, the at least two resource sets are indexed according to an order of firstly time domain and then frequency domain; or, the at least two resource sets are indexed in each of resource blocks according to an order of firstly frequency domain and then time domain, and then indexed according to an ascending or descending order of the resource blocks; or, the at least two resource sets are indexed in each of resource blocks according to an order of firstly time domain and then frequency domain, and then indexed according to an ascending or descending order of the resource blocks.

In an optional implementation, a set division way of the resource sets is pre-determined or pre-configured.

In an optional implementation, at least one resource set of the first category is used for transmitting the UCI; each resource set of the first category is used for transmitting one UCI modulation symbol; each UCI modulation symbol, after spreading is performed on the UCI modulation symbol, is mapped to all resource elements in the resource set of the first category for transmission.

According to a second aspect of the implementation of the present application, an uplink transmission method is provided. The method includes: an access network device determines at least two resource sets, wherein frequency domain positions of at least two resource elements in resource elements in each resource set of the at least two resource sets are different; the access network device sends a configuration signaling to a terminal device, wherein the configuration signaling is used for configuring a resource set of a first category in the at least two resource sets, and the resource set of the first category is used for transmitting uplink control information (UCI) in an uplink control channel; and the access network device receives the uplink control channel.

In an optional implementation, the configuration signaling is further used for configuring a resource set of a second category in the at least two resource sets, and the resource set of the second category is used for transmitting an uplink reference signal in the uplink control channel.

In an optional implementation, a length Q of a reference signal sequence used for the uplink reference signal is equal to a quantity of resource elements in one resource set of the second category corresponding to the uplink reference signal; or, the length Q of the reference signal sequence used for the uplink reference signal is equal to a quantity of resource elements in a single resource block in one resource set of the second category corresponding to the uplink reference signal.

In an optional implementation, a quantity of resource elements included in the each resource set of the at least two resource sets is same. In an optional implementation, resource elements in the each resource set of the at least two resource sets belong to one time domain unit in time domain.

In an optional implementation, resource elements in the each resource set of the at least two resource sets belong to one resource block in frequency domain.

In an optional implementation, resource elements in the each resource set of the at least two resource sets belong to a plurality of resource blocks in frequency domain, and the uplink control channel is transmitted through the plurality of resource blocks.

In an optional implementation, resource elements belonging to one time domain unit in the each resource set of the at least two resource sets are distributed with an equal interval in frequency domain.

In an optional implementation, the at least two resource sets are indexed according to an order of firstly frequency domain and then time domain; or, the at least two resource sets are indexed according to an order of firstly time domain and then frequency domain; or, the at least two resource sets are indexed in each of resource blocks according to an order of firstly frequency domain and then time domain, and then indexed according to an ascending or descending order of the resource blocks; or, the at least two resource sets are indexed in each of resource blocks according to an order of firstly time domain and then frequency domain, and then indexed according to an ascending or descending order of the resource blocks.

In an optional implementation, a set division way of the resource sets is pre-determined or pre-configured.

In an optional implementation, at least one resource set of the first category is used for transmitting the UCI; each resource set of the first category is used for transmitting one UCI modulation symbol; each UCI modulation symbol, after spreading is performed on the UCI modulation symbol, is mapped to all resource elements in the resource set of the first category for transmission.

According to a third aspect of the implementation of the present application, an uplink transmission apparatus is provided. The uplink transmission apparatus includes at least one unit for implementing the uplink transmission method provided by the first aspect or any one of the optional implementations of the first aspect.

According to a fourth aspect of the implementation of the present application, an uplink transmission apparatus is provided. The uplink transmission apparatus includes at least one unit for implementing the uplink transmission method provided by the second aspect or any one of the optional implementations of the second aspect.

According to a fifth aspect of the implementation of the present application, a terminal device is provided. The terminal device includes a processor, a storage, a transmitter and a receiver. The storage is used for storing one or more instructions indicated to be executed by the processor, and the processor is used for implementing the uplink transmission method provided by the first aspect or any one of the optional implementations of the first aspect.

According to a sixth aspect of the implementation of the present application, an access network device is provided. The access network device includes a processor, a storage, a transmitter and a receiver. The storage is used for storing one or more instructions indicated to be executed by the processor, and the processor is used for implementing the uplink transmission method provided by the second aspect or any one of the optional implementations of the second aspect.

According to a seventh aspect of the implementation of the present application, a computer readable medium is provided. The computer readable medium stores one or more instructions for implementing the uplink transmission method provided by the first aspect or any one of the optional implementations of the first aspect.

According to an eighth aspect of the implementation of the present application, a computer readable medium is provided. The computer readable medium stores one or more instructions for implementing the uplink transmission method provided by the second aspect or any one of the optional implementations of the second aspect.

According to a ninth aspect of the implementation of the present application, an uplink transmission system is provided. The uplink transmission system includes a terminal device and an access network device. The terminal device includes the uplink transmission apparatus provided by the third aspect or any one of the optional implementations of the third aspect. The access network device includes the uplink transmission apparatus provided by the fourth aspect or any one of the optional implementations of the fourth aspect.

According to a tenth aspect of the implementation of the present application, an uplink transmission system is provided. The uplink transmission system includes a terminal device and an access network device. The terminal device is the terminal device provided by the fifth aspect or any one of the optional implementations of the fifth aspect. The access network device is the access network device provided by the sixth aspect or any one of the optional implementations of the sixth aspect.

BRIEF DESCRIPTION OF DRAWINGS

To describe technical solutions in implementations of the present application more clearly, drawings that need to be used in the description of the implementations will be briefly introduced below. It is apparent that the drawings described below are only some implementations of the present application, and for those of ordinary skill in the art, other drawings may be obtained according to these drawings without paying an inventive effort.

DETAILED DESCRIPTION

To make objects, technical solutions and advantages of the present application more clearer, implementations of the present application will be described in further detail below with reference to the accompanying drawings.

The "module" mentioned herein generally refers to programs or instructions stored in a storage, which can implement certain functions. The "unit" mentioned herein generally refers to a functional structure divided according to logic, and the "unit" may be implemented by hardware alone or a combination of hardware and software.

The "multiple" mentioned herein refers to two or more. The "and/or" is an association relationship describing associated objects, indicating that there may be three relationships, for example, A and/or B, which may indicate three situations: A alone, A and B, and B alone. The character "/" generally indicates that the objects before and after the character have an "or" relationship.

Figure 1:
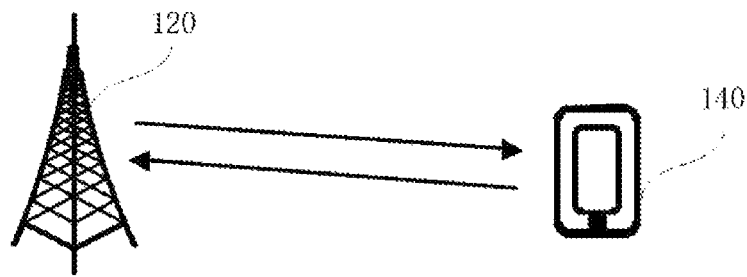
FIG. 1 is a schematic diagram of structure of a mobile communication system provided by an exemplary implementation of the present application.

Referring to FIG. 1, FIG. 1 is a schematic diagram of structure of a mobile communication system provided by an implementation of the present application. The mobile communication system may be a 5G system, which is also called a new radio (NR) system. The mobile communication system includes an access network device 120 and a terminal 140.

The Access network device 120 may be a base station. For example, the base station may be a base station (gNB) with a central distributed architecture in the 5G system. When the central distributed architecture is used for the access network device, the access network device 120 usually includes a central unit (CU) and at least two distributed units (DUs). The central unit is provided with protocol stacks of a Packet Data Convergence Protocol (PDCP) layer, a Radio Link Control (RLC) layer and a Media Access Control (MAC) layer. The distributed unit is provided with a Physical (PHY) layer protocol stack. The implementations of the present application do not limit the specific implementations of the access network device 120. Optionally, the access network device may also include a Home eNB (HeNB), a Relay, and a Pico base station, etc.

The access network device 120 and the terminal 140 establish a radio connection through a radio air interface. Optionally, the radio air interface is a radio air interface based on a 5th generation mobile communication network technology (5G) standard. For example, the radio air interface is a New Radio (NR). Optionally, the radio air interface may be a radio air interface based on a next generation mobile communication network technology standard beyond 5G.

The terminal 140 may refer to a device that provides voice and/or data connectivity to a user. The terminal may communicate with one or more core networks via a Radio Access Network (RAN). The terminal 140 may be a mobile terminal, such as a mobile phone (or called a "cellular" phone) and a computer with a mobile terminal, e.g., a portable, pocket-sized, handheld, computer-built or vehicle-mounted mobile device. For example, the terminal may be a Subscriber Unit, a Subscriber Station, a Mobile Station, a Mobile, a Remote Station, an Access Point, a Remote Terminal, an Access Terminal, a User Terminal, a User Agent, a User Device, or a User Equipment.

It should be noted that the mobile communication system shown in FIG. 1 may include a plurality of access network devices 120 and/or a plurality of terminals 140. In FIG. 1, one access network device 120 and one terminal 140 are illustrated, but the implementation is not limited thereto.

In the 5G NR, some new designs of low delay and fast feedback are required. For example, one time slot may be divided into a downlink portion and an uplink portion, and the downlink portion and the uplink portion are separated by a Guard Period (GP). The downlink portion consists of one or more symbols. At the starting of the time slot, a gNB sends downlink data and signaling to a UE through the downlink portion. The UE completes transmission switching from the downlink to the uplink through the GP, then the UE transmits an uplink control channel and an uplink shared channel in the uplink portion. In the uplink portion, in order to realize fast feedback (eventually leading to fast turnover time), the UE may be required to feed back ACK/NACK (and other possible UCI) for a physical downlink shared channel (PDSCH) carried by the downlink portion in the current time slot. In this case, a new PUCCH is introduced into the NR, and the new PUCCH is sent at the end of the time slot. Since the new PUCCH may occupy only the last one or several symbols in the time slot, the new PUCCH may be referred to as a PUCCH with a short duration, or a PUCCH with a short format, or a short-PUCCH. Herein, the uplink control channel may have any other possible names, and the implementations of the present application do not limit possible names and abbreviations of the uplink control channel.

The short-PUCCH is mainly used for feeding back ACK/NACK, and a valid payload of the short-PUCCH may be 1-2 bits or more. An expected standard design may have a good scalability from a low payload (1-2 bits) to a high payload (>2 bits). It is further expected that the design of a short-PUCCH with 2 symbols (or possibly >2 symbols) may be extended from the design of a short-PUCCH with 1 symbol. Aspects to be considered may include frequency diversity, power boost, a good capacity of the PUCCH, and RS overhead, etc.

To realize these requirements and expectations, Resource Elements (REs) used for the short-PUCCH may be divided into several resource sets. REs in each resource set are evenly distributed in frequency, and the REs in each resource set are interleaved with the REs in other resource sets. Each resource set may be used for sending an uplink Reference Signal (RS) or uplink control information (UCI).

REs used for the short-PUCCH usually belong to at least one time slot unit of at least one Physical Resource Block (PRB), for example, 12 REs in 1 time slot symbol of 1 PRB, 24 REs in 2 time slot symbols of 1 PRB, 24 REs in 1 time slot symbol of 2 PRBs, 48 REs in 2 time slot symbols of 2 PRBs, etc. Time-frequency resources used for the short-PUCCH may be divided into at least two resource sets.

Figure 2:
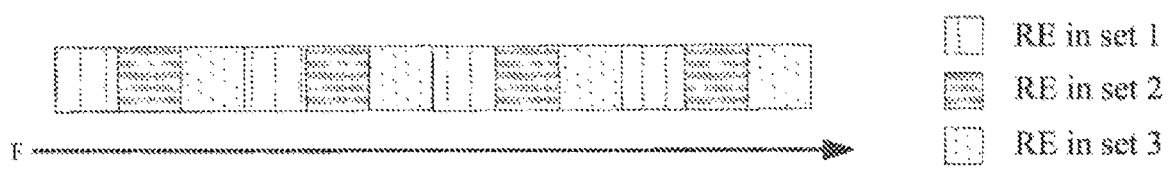
FIG. 2 is a schematic diagram of division of sets of resources for a short-PUCCH provided by an exemplary implementation of the present application.

FIG. 2 shows an example in which time-frequency resources used for a short-PUCCH include 12 REs in 1 time slot symbol of 1 PRB, the 12 REs are divided into 3 resource sets, the REs in each resource set are evenly distributed in frequency, and REs from the each resource set are interleaved with REs from other resource sets. Herein, REs in a resource set 1 may be used for carrying an RS, and REs in a resource set 2 and a resource set 3 may be used for carrying UCI. Since the RSs are expected to be evenly distributed in frequency for a good channel estimation performance, the REs from various resource sets are interleaved together.

Figure 3:
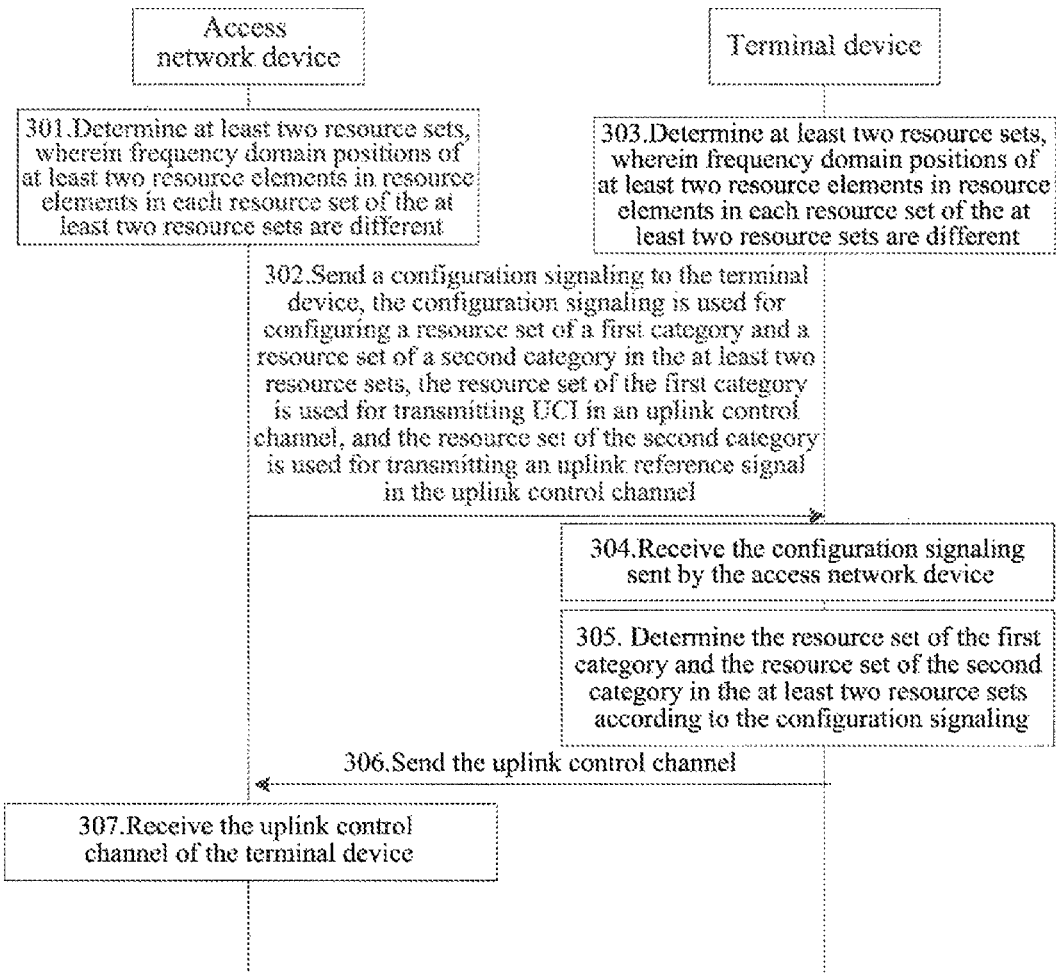
FIG. 3 is a flowchart of an uplink transmission method provided by an exemplary implementation of the present application.

Referring to FIG. 3, FIG. 3 is a flowchart of an uplink transmission method provided by an exemplary implementation. The implementation is described by taking the uplink transmission method applied to the mobile communication system shown in FIG. 1 as an example. In the implementation, the terminal device may be a UE, and the access network device may be a gNB. The present implementation may be applied to a scenario for sending a short-PUCCH. The method includes the following acts 301-307.

In act 301, an access network device determines at least two resource sets, and frequency domain positions of at least two resource elements in resource elements in each resource set of the at least two resource sets are different.

The access network device divides time-frequency resources used for a short-PUCCH into at least two resource sets according to a preset set division way. Each resource set is used for transmitting an RS or UCI.

There are at least two REs of which frequency domain positions are different in REs of the each resource set. Optionally, in a resource set, frequency domain positions of a part of REs are the same, and frequency domain positions of the other part of REs are different. Or, frequency domain positions of all REs in one resource set are different. By distributing REs in one resource set as discretely as possible, a better channel estimation gain can be obtained when the resource set is used for transmitting the RS.

In act 302, the access network device sends a configuration signaling to a terminal device, wherein the configuration signaling is used for configuring a resource set of a first category and a resource set of a second category in the at least two resource sets, the resource set of the first category is used for transmitting uplink control information (UCI) in an uplink control channel, and the resource set of the second category is used for transmitting an uplink reference signal in the uplink control channel.

For a given resource set, whether the resource set is used for transmitting the RS or the UCI is dynamically configured by the access network device. For example, in FIG. 2, a resource set 1 is used for transmitting the RS, and a resource set 2 and a resource set 3 are used for transmitting the UCI. For another example, in the FIG. 2, the resource sets 1 and 2 are used for transmitting the RS, and the resource set 3 is used for transmitting the UCI.

According to an actual scenario of the uplink sending of the terminal device, the access network device generates the configuration signaling for the terminal device. The configuration signaling is used for configuring the resource set of the first category and the resource set of the second category in at least two resource sets for the short-PUCCH. Herein, the resource set of the first category is used for transmitting UCI in a short-PUCCH, and the resource set of the second category is used for transmitting an RS in the short-PUCCH. The resource set of the first category includes one or more resource sets, and the resource set of the second category includes one or more resource sets. In a scenario where the RS does not need to be sent, a quantity of the resource set of the second category may be zero.

A specific configuration mode of the configuration signaling may be any one of the following three configuration modes.

First, the configuration signaling is used for explicitly configuring the resource set of the first category, and implicitly indicating that the resource set of the second category is other resource sets except the resource set of the first category. For example, referring to FIG. 2, when the access network device explicitly indicates that the resource set 1 is the resource set of the first category in the configuration signaling, the terminal determines the resource set 2 and the resource set 3 as the resource set of the second category while determining that the resource set 1 is the resource set of the first category according to the configuration signaling.

Second, the configuration signaling is used for explicitly configuring the resource set of the second category, and implicitly indicating that the resource set of the first category is other resource sets except the resource set of the second category. For example, referring to FIG. 2, when the access network device explicitly indicates in the configuration signaling that the resource set 2 is the resource set of the second category, the terminal determines other resource sets except the resource set of the second category as the resource set of the first category while determining that the resource set 2 is the resource set of the second category according to the configuration signaling, that is, the terminal determines the resource set 1 and the resource set 3 as the resource set of the first category.

Third, the configuration signaling is used for explicitly configuring the resource set of the first category and the resource set of the second category. For example, refer to FIG. 2, the access network device explicitly indicates in the configuration signaling that the resource sets 2 and 3 are the resource set of the first category and the resource set 1 is the resource set of the second category, then the terminal determines that the resource sets 2 and 3 are the resource set of the first category and the resource set 1 is the resource set of the second category according to the configuration signaling.

Optionally, the second configuration signaling is adopted, that is, the configuration signaling is used for explicitly configuring the resource set of the second category, and implicitly indicating that the resource set of the first category is other resource sets except the resource set of the second category.

Optionally, the configuration signaling is carried in a high-layer signaling or Downlink Control Information (DCI). For example, the high-layer signaling may be a Radio Resource Control (RRC) reconfiguration signaling. The configuration signaling may be semi-statically configured or dynamically notified.

In act 303, the terminal device determines the at least two resource sets, and the frequency domain positions of at least two resource elements in resource elements in each resource set of the at least two resource sets are different.

Optionally, the terminal device divides the time-frequency resources used for the short-PUCCH into at least two resource sets according to the same set division way as that of the access network device. Each resource set is used for transmitting the RS or the UCI.

This act may be performed before, or after the act 302, or simultaneously with the act 302, or after act 304, and the implementation is not limited thereto.

In act 304, the terminal device receives the configuration signaling sent by the access network device.

In act 305, the terminal device determines a resource set of a first category and a resource set of a second category in the at least two resource sets according to the configuration signaling.

The resource set of the first category is used for transmitting uplink control information in an uplink control channel, and the resource set of the second category is used for transmitting an uplink reference signal in the uplink control channel.

In act 306, the terminal device sends the uplink control channel.

According to the configuration signaling, the terminal device sends the uplink control information, such as an ACK/NACK, on the resource elements of the resource set of the first category; and sends an uplink reference signal, such as a Demodulation Reference Signal (DM-RS), on the resource elements of the resource set of the second category.

In act 307, the access network device receives the uplink control channel of the terminal device.

According to the configuration signaling, the access network device receives the uplink control information, such as an ACK/NACK, on the resource elements of the resource set of the first category; and receives the uplink reference signal, such as the DM-RS, on the resource elements of the resource set of the second category.

In conclusion, in the uplink transmission method provided by the present implementation, the resources used for transmitting the short-PUCCH are divided into at least two resource sets, the access network device configures the resource set of the first category and the resource set of the second category in the at least two resource sets to the terminal device, and the terminal sends the uplink control channel according to the configuration of the access network device, so that the RS overhead and structure in the short-PUCCH can be dynamically adjusted, thereby obtaining a better PUCCH demodulation performance.

Figure 4:
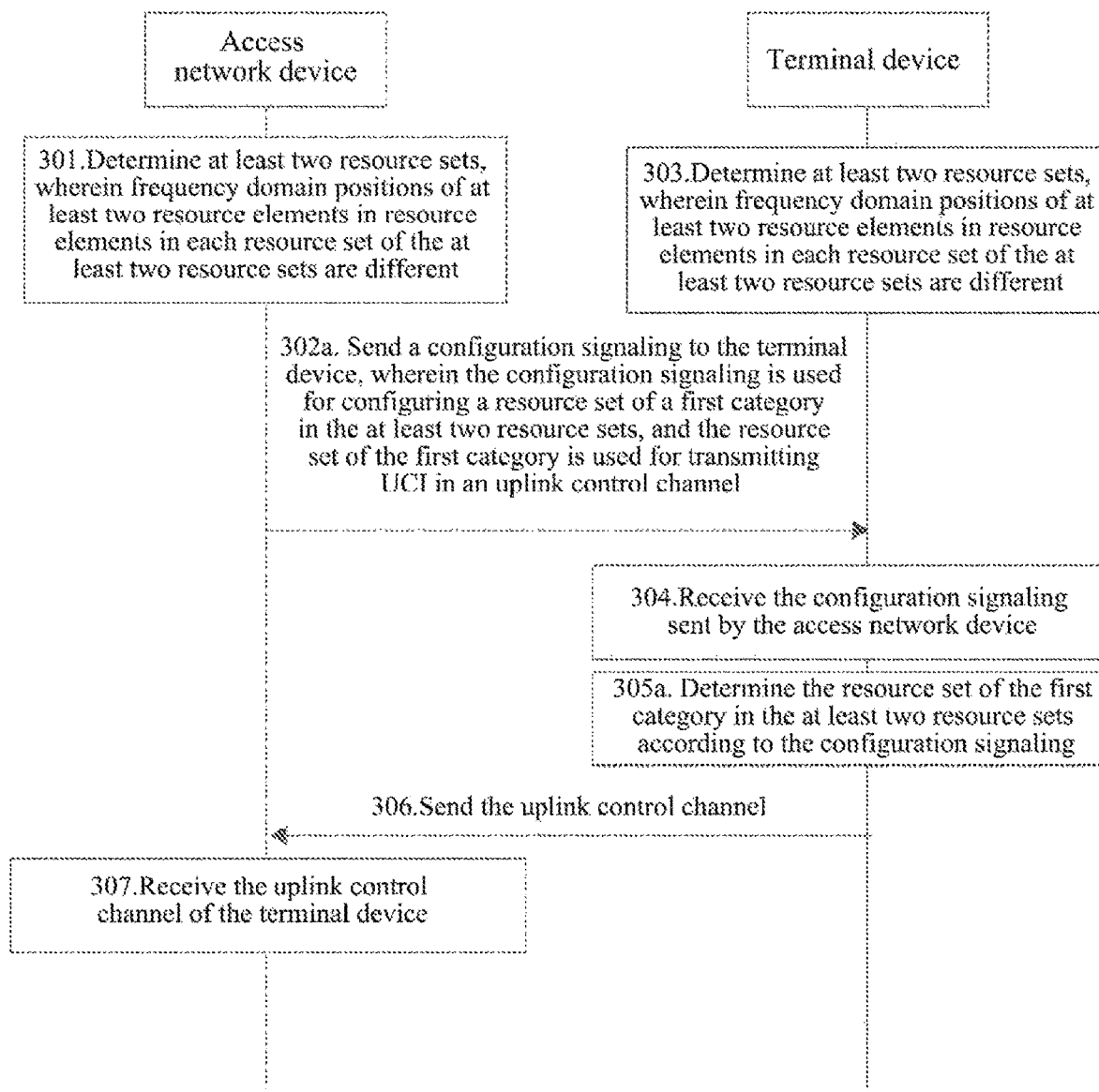
FIG. 4 is a flowchart of an uplink transmission method provided by another exemplary implementation of the present application.

In an optional implementation based on FIG. 3, in some scenarios where the RS does not need to be sent, the at least two resource sets may all be configured as the resource set of the first category, in this case the above configuration signaling is only used for configuring the resource set of the first category in the at least two resource sets, the act 302 may be replaced with act 302a, and act 305 may be replaced with act 305a, as shown in FIG. 4.

In an optional implementation based on FIG. 3, a set division way used for dividing the time-frequency resources for the short-PUCCH into at least two resource sets, may be pre-determined by a communication protocol, or pre-configured by an access network device to a terminal device.

Figure 5:
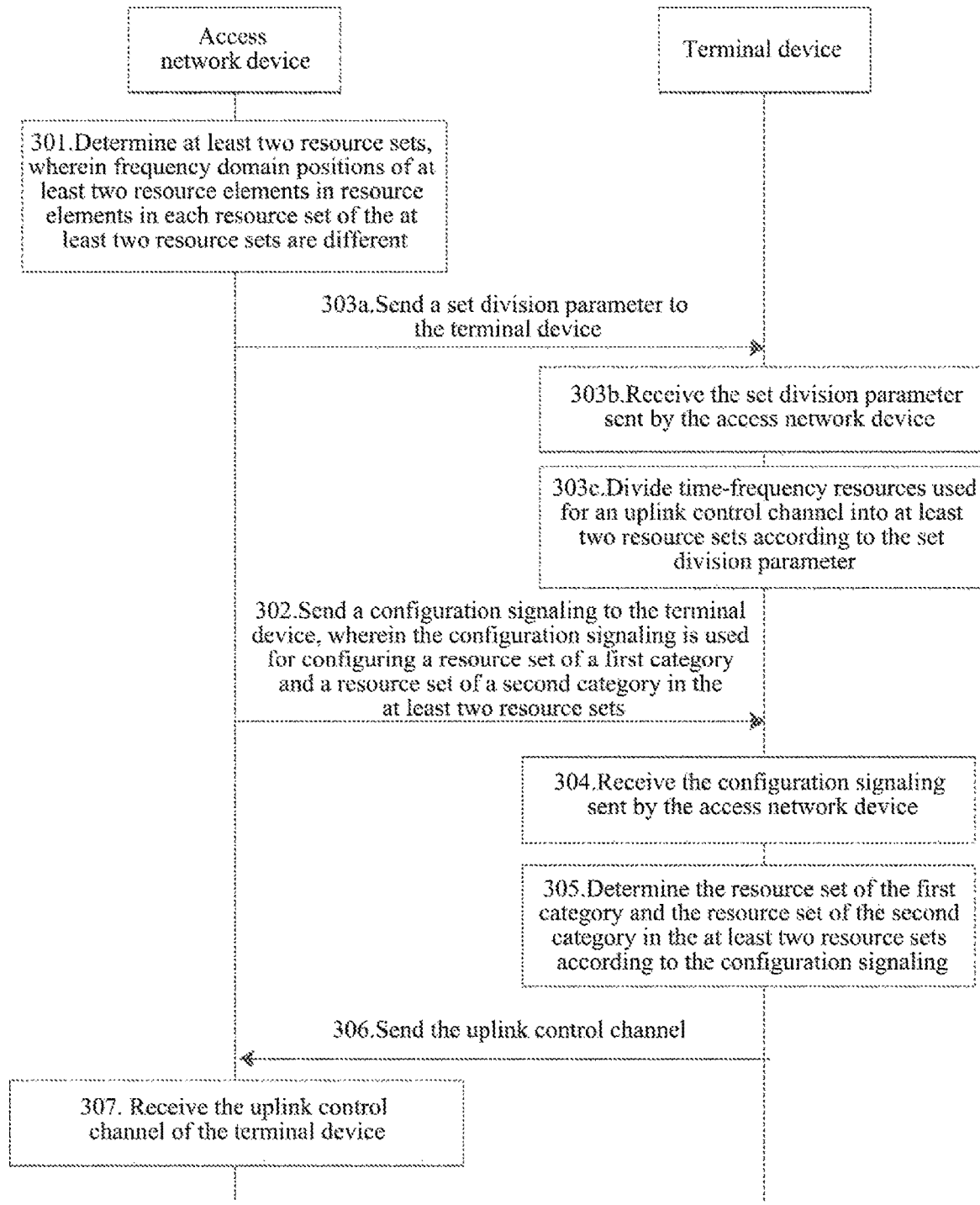
FIG. 5 is a flowchart of an uplink transmission method provided by another exemplary implementation of the present application.

If the set division way is pre-determined, in acts 301 and 303 the access network device and the terminal respectively divides the time-frequency resources for the short-PUCCH according to the pre-determined set division way. If the set division way is pre-configured, the above act 303 may be replaced with acts 303a to 303c, as shown in FIG. 5.

In act 303a, the access network device sends a set division parameter to the terminal device.

The set division parameter includes at least one of: a quantity of resource sets, a quantity of resource sets in each time slot unit, a quantity of resource sets in each PRB, and a quantity of REs in each resource set.

In act 303b, the terminal device receives the set division parameter sent by the access network device.

In act 303c, the terminal device divides time-frequency resources for an uplink control channel into at least two resource sets according to the set division parameter.

The time-frequency resources for the uplink control channel may include at least one time domain unit on at least one resource block, and the at least one time domain unit is one or two time domain symbols.

Herein, according to different implementations, the set division way includes but is not limited to following three ways.

A set division way 1: there are T resource blocks and N time domain units, and the quantity of the at least two resource sets is $P=N*A$, wherein resource elements of each time domain unit is divided into A resource sets, and P, N and A are all positive integers.

Figure 6:
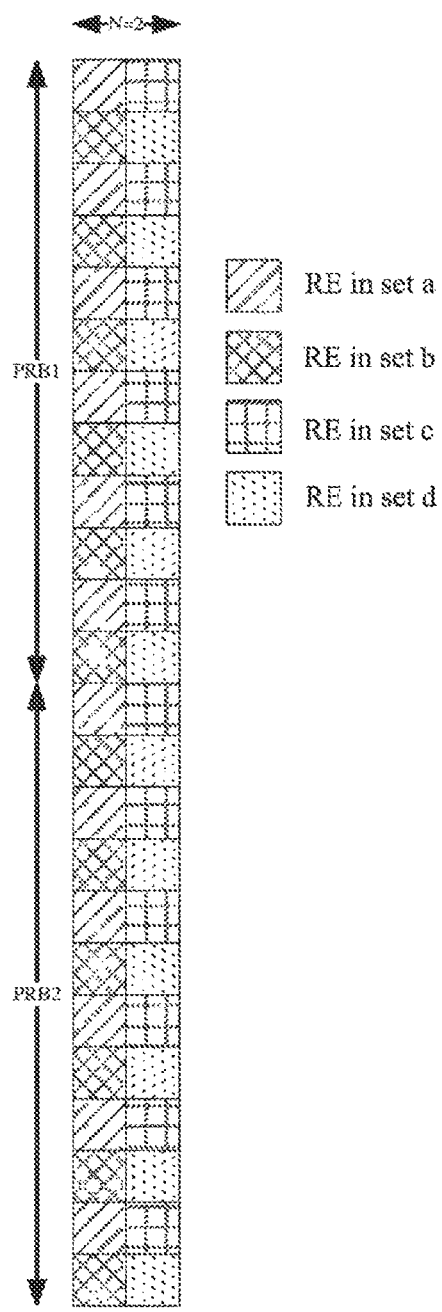
FIG. 6 is a schematic diagram of division of sets of resources for a short-PUCCH provided by an exemplary implementation of the present application.

Exemplarily, assuming $T=2$, $N=2$, and referring to FIG. 6, the time-frequency resources for the short-PUCCH include 48 REs in 2 time domain symbols of 2 PRBs. 12 REs in each time domain symbol are divided into 2 resource sets to obtain a total quantity $P=N*A=2*2=4$ of resource sets. That is, 12 REs numbered 1, 3, 5, 7, 9, 11, 13, 15, 17, 19, 21 and 23 in the first time domain symbol are divided into a resource set a, and 12 REs numbered 2, 4, 6, 8, 10, 12, 14, 16, 18, 20, 22 and 24 in the first time domain symbol are divided into a resource set b; 12 REs numbered 1, 3, 5, 7, 9, 11, 13, 15, 17, 19, 21 and 23 in the second time domain symbol are divided into a resource set c, and 12 REs numbered 2, 4, 6, 8, 10, 12, 14, 16, 18, 20, 22 and 24 in the second time domain symbol are divided into a resource set d.

Herein, the first time domain symbol refers to a symbol on a left side of two adjacent symbols, and the second time domain symbol refers to a symbol on a right side of the two adjacent symbols in the figure. The RE number refers to a serial number according to an order from top to bottom.

A set division way 2: there are T resource blocks and N time domain units, and a quantity of the at least two resource sets is $P=N*T*B$, wherein the resource elements in each time domain unit of each resource block are divided into B resource sets, and P, N and B are all positive integers.

Figure 7:
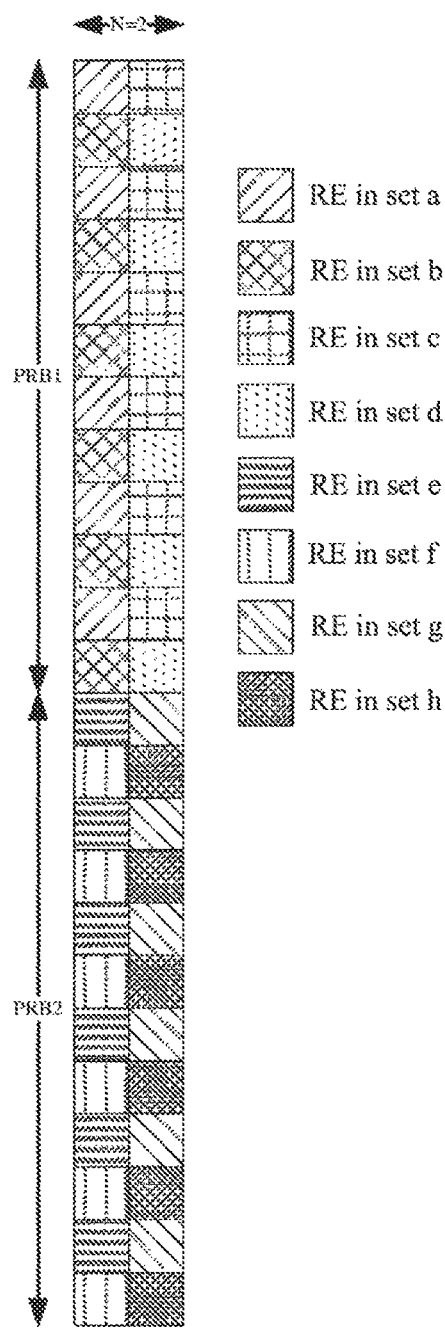
FIG. 7 is a schematic diagram of division of sets of resources for a short-PUCCH provided by another exemplary implementation of the present application.

Exemplarily, assuming $T=2$, $N=2$, and referring to FIG. 7, time-frequency resources for a short-PUCCH include 48 REs in 2 time domain symbols of 2 PRBs. 12 REs in each time domain symbol of each PRB are divided into 2 resource sets to obtain a total quantity $P=T*N*B=2*2*2=8$ of resource sets. That is, 6 REs numbered 1, 3, 5, 7, 9, 11 in the first time domain symbol of the first PRB are divided into a resource set a, and 6 REs numbered 13, 15, 17, 19, 21, and 23 in the first time domain symbol of the first PRB are divided into a resource set b; 6 REs numbered 1, 3, 5, 7, 9 and 11 in the second time domain symbol of the first PRB are divided into a resource set c, and 6 REs numbered 13, 15, 17, 19, 21 and 23 in the second time domain symbol of the first PRB are divided into a resource set d; 6 REs numbered 1, 3, 5, 7, 9 and 11 in the first time domain symbol of the second PRB are divided into a set e, and 6 REs numbered 13, 15, 17, 19, 21 and 23 in the first time domain symbol of the second PRB are divided into a resource set f; 6 REs numbered 1, 3, 5, 7, 9 and 11 in the second time domain symbol of the second PRB are divided into a resource set g, and 6 REs numbered 13, 15, 17, 19, 21 and 23 in the second time domain symbol of the second PRB are divided into a resource set h.

A set division way 3: at least one resource block includes a target resource block and T−1 other resource blocks (total quantity is T), the quantity of time domain units is N, and the quantity of the at least two resource sets are P=N*C. Resource elements of N time domain units in the target resource block are divided into C resource sets, and the set division way of other resource blocks is the same as that of the target resource block.

Figure 8:
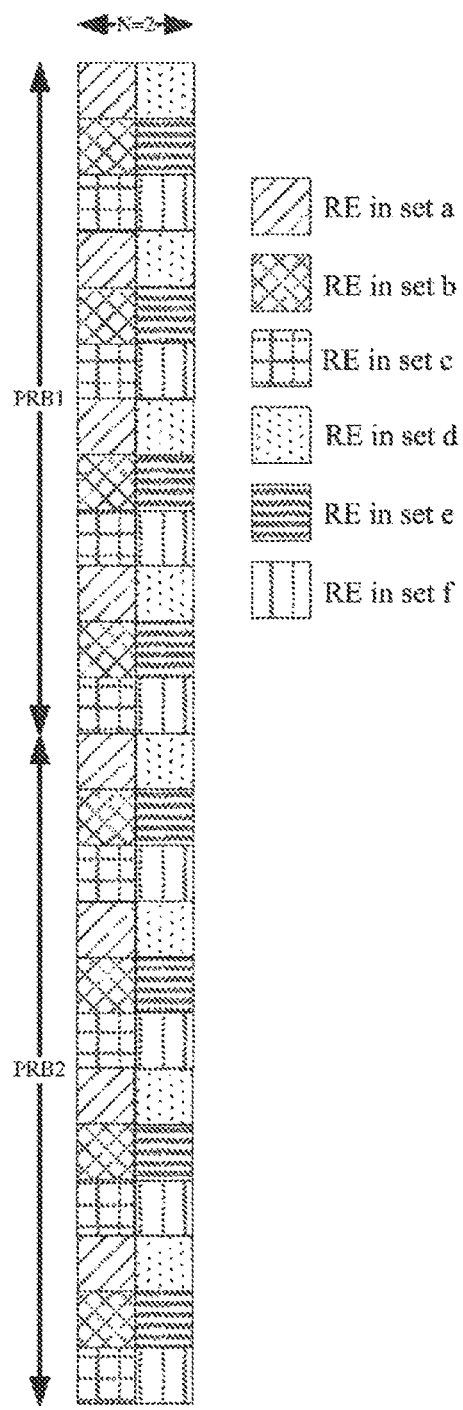
FIG. 8 is a schematic diagram of division of sets of resources for a short-PUCCH provided by another exemplary implementation of the present application.

Exemplarily, assuming T=2, N=2, and referring to FIG. 8, time-frequency resources for a short-PUCCH include 48 REs in 2 time domain symbols of 2 PRBs. 12 REs in each time domain symbol of the first PRB are divided into 3 resource sets, and the second PRB adopts the same set division way as that of the first PRB to obtain a total quantity P=N*C=2*3=6 of resource sets. That is, 4 REs numbered 1, 4, 7 and 10 in the first time domain symbol of the first PRB are divided into a resource set a; 4 REs numbered 2, 5, 8 and 11 in the first time domain symbol of the first PRB are divided into a resource set b; 4 REs numbered 3, 6, 9 and 12 in the first time domain symbol of the first PRB are divided into a resource set c; 4 REs numbered 1, 4, 7 and 10 in the second time domain symbol of the first PRB are divided into a resource set d; 4 REs numbered 2, 5, 8 and 11 in the second time domain symbol of the first PRB are divided into a resource set e; 4 REs numbered 3, 6, 9 and 12 in the second time domain symbol of the first PRB are divided into a resource set f.

In the above three set division ways, the set division parameter includes at least one of: a quantity of resource sets in each PRB, a quantity of resource sets in each time domain symbol, a quantity of resource sets in each time domain symbol of each PRB, a set division way (one of the above three division way), and a position of a resource block.

Optionally, distribution of REs in each resource set satisfies at least one of following characteristics:
1. Each resource set of the at least two resource sets contains a same quantity of resource elements. For example, the each resource set in FIG. 6 includes 12 REs, the each resource set in FIG. 7 includes 6 REs, and the each resource set in FIG. 8 includes 8 REs.
2. The resource elements in the each resource set of the at least two resource sets belong to one time domain unit in time domain. For example, the resource elements in the resource set a in FIG. 6 belong to the first time domain symbol, the resource elements in the resource set b in FIG. 6 belong to the first time domain symbol, the resource elements in the resource set c in FIG. 6 belong to the second time domain symbol, and the resource elements in the resource set d in FIG. 6 belong to the second time domain symbol.
3. The resource elements in the each resource set of the at least two resource sets belong to one resource block in frequency domain. For example, REs in the each resource set in FIG. 7 belong to the same PRB in the frequency domain.
4. The resource elements in the each resource set of the at least two resource sets belong to a plurality of resource blocks in the frequency domain, and the uplink control channel is transmitted through the plurality of resource blocks. The "plurality" in the present application refers to at least two.

For example, REs in the each resource set in FIGS. 6 and 8 belong to 2 PRBs in the frequency domain.
5. The resource elements belonging to one time domain unit in the each resource set of the at least two resource sets are distributed with an equal interval in the frequency domain.

For example, the resource elements belonging to one time domain unit in the each resource set in FIGS. 6 and 7 are distributed with an equal interval (an interval of 1) in the frequency domain. The resource elements belonging to one time domain unit in the each resource set in FIG. 8 are distributed with an equal interval (an interval of 2) in the frequency domain.

Optionally, each resource set has a corresponding set index. The mode for establishing a set index includes any of following four modes.

First, the at least two resource sets are indexed according to an order of firstly frequency domain and then time domain. Taking FIG. 7 as an example, the order of resource set indexes thereof is {set a, set b, set e, set f, set c, set d, set g, set h}.

Second, the at least two resource sets are indexed according to an order of firstly time domain and then frequency domain. Taking FIG. 7 as an example, the order of resource set indexes thereof is {set a, set c, set b, set d, set e, set g, set f, set h}.

Third, the at least two resource sets are indexed in each resource block according to an order of firstly frequency domain and then time domain, and then indexed according to an ascending or descending order of resource blocks. For example, assuming a downward order in FIG. 7 is the ascending order of PRBs, and the order of resource set indexes thereof is {set a, set b, set c, set d, set e, set f, set g, set h}.

Fourth, the at least two resource sets are indexed in each resource block according to an order of firstly time domain and then frequency domain, and then indexed according to an ascending or descending order of resource blocks. For example, assuming a downward order in FIG. 7 is the ascending order of PRBs, and the order of resource set indexes thereof is {set a, set c, set b, set d, set e, set g, set f, set h}.

In the method implementations described above, when the gNB sends the configuration signaling to the UE, the configuration signaling carries the set index of the resource set of the first category, or the set indexes of the resource set of the first category and the resource set of the second category, or the set index of the resource set of the second category.

In the method implementations described above, the uplink reference signal sent by the terminal device in the uplink control channel includes: a Demodulation Reference Signal (DM-RS) and a Sounding Reference Signal (SRS). The DM-RS is used by the base station for performing channel estimation on coherent demodulation of the uplink physical channel (PUSCH and PUCCH). Therefore, the DM-RS is sent together with the PUCCH. The SRS is used by the base station for estimating uplink channel states of different frequencies.

When a terminal device sends an uplink reference signal on REs in a resource set of a second category, the terminal device may transmit one or more uplink reference signals, and each uplink reference signal is sent by using one or more resource sets of the second category. A length Q of a reference signal sequence used for the uplink reference signal may adopt any one of following two forms.

First, the length Q of the reference signal sequence used for the uplink reference signal is equal to a quantity of REs in one (or single) resource set of the second category corresponding to the uplink reference signal. For example, when the RS is sent in the resource set a shown in FIG. 6, the length Q of the reference signal sequence=the quantity of REs in the resource set a=12.

Second, the length Q of the reference signal sequence used for the uplink reference signal is equal to a quantity of resource elements in a single resource block in one (or single) resource set of a second category corresponding to the uplink reference signal. For example, when the RS is sent in the resource set a shown in FIG. 6, the length Q of the reference signal sequence=the quantity of REs in the resource set a=12.

Optionally, the above-mentioned reference signal sequence is a Zadoff-Chu sequence. The same one uplink reference signal is usually transmitted in the REs in one resource set of the second category, but in a scenario where the terminal needs to transmit multiple uplink reference signals, different uplink reference signals may be multiplexed in the REs in the same resource set of the second category for transmission. That is, the resource set of the second category corresponding to different uplink reference signals may be the same resource set, or different resource sets.

In the above method implementations, the UCI sent by the terminal device in the uplink control channel includes at least one of: an ACK/NACK for feedback of a PDSCH, Channel-State Information (CSI), and a Scheduling Request (SR).

When a terminal device sends uplink control information on REs in a resource set of a first category, the terminal device modulates the UCI to obtain at least one UCI modulation symbol to be sent, and each resource set of the first category is used for transmitting one UCI modulation symbol. After spreading is performed on the UCI modulation symbol through a spreading sequence, the terminal device transmits the spread UCI modulation symbol on all REs in the corresponding resource set of the first category.

Optionally, a length of a spreading sequence is equal to a quantity of REs in a resource set of a first category corresponding to a UCI modulation symbol. For example, each resource set in FIG. 7 includes 6 REs. When one UCI modulation symbol is transmitted by using a resource set a, spreading is performed on the UCI modulation symbol by using a spreading sequence of which a length is 6, and then the spread UCI modulation symbol is mapped to 6 REs in the resource set a for transmission.

In conclusion, since a gNB may dynamically configure the resource set of the first category for transmitting the UCI and the resource set of the second category for transmitting the RS to the UE according to factors, such as channel conditions of the UE and an amount of data to be sent, the resource division for the short-PUCCH is dynamically configured, thereby better RS overhead and a better or best PUCCH demodulation performance are achieved.

The following is apparatus implementations of the implementations of the present application. The parts which are not described detailedly in the apparatus implementations, may refer to the technical details disclosed in the above method implementations.

Figure 9:
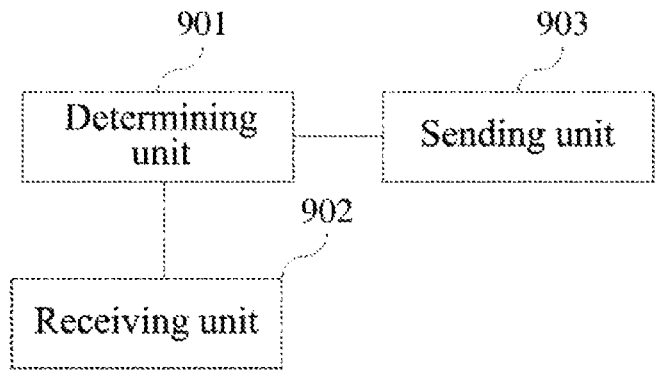
FIG. 9 is a block diagram of structure of an uplink transmission apparatus provided by another exemplary implementation of the present application.

Referring to FIG. 9, FIG. 9 is a schematic diagram of structure of an uplink data apparatus provided by an implementation of the present application. The uplink data apparatus may be realized as all or a part of the terminal device through software, hardware, or a combination of the software and hardware. The uplink data apparatus includes a determining unit 901, a receiving unit 902, and a sending unit 903.

The determining unit 901 is used for performing functions of the above acts 303, 303c, 305a and at least one of other explicit or implicit determination acts.

The receiving unit 902 is used for performing functions of the above acts 304, 303b and at least one of other explicit or implicit receiving acts.

The sending unit 903 is used for performing the above act 306 and at least one of other explicit or implicit sending acts.

Figure 10:
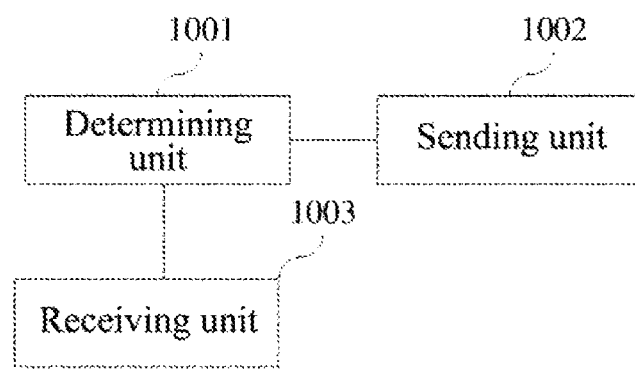
FIG. 10 is a block diagram of structure of an uplink transmission apparatus provided by another exemplary implementation of the present application.

Referring to FIG. 10, FIG. 10 is a schematic diagram of structure of an uplink data apparatus provided by an implementation of the present application. The uplink data apparatus may be realized as all or a part of the access network device through software, hardware, or a combination of the software and hardware. The uplink data apparatus includes a determining unit 1001, a sending unit 1002, and a receiving unit 1003.

The determining unit 1001 is used for performing functions of the above act 301 and at least one of other explicit or implicit determination acts.

The sending unit 1002 is used for performing functions of the above acts 302, 302a, 303a and at least one of other explicit or implicit sending acts.

The receiving unit 1003 is used for performing functions of the above act 307 and at least one of other explicit or implicit receiving acts.

Figure 11:
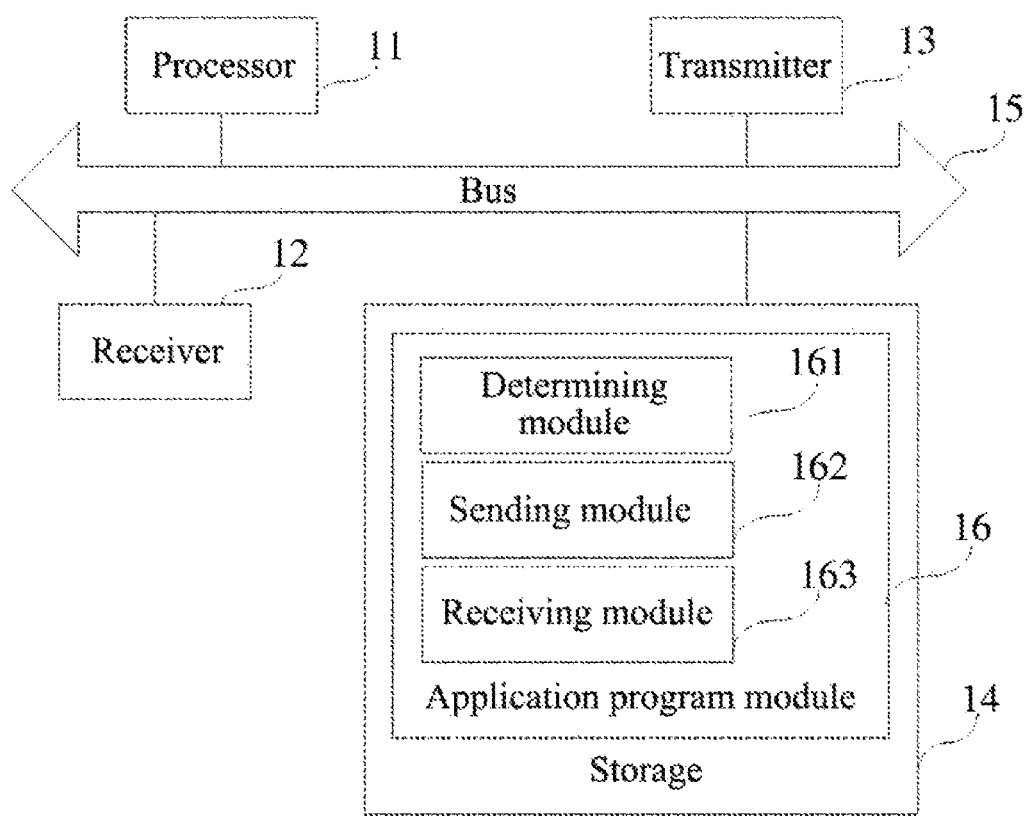
FIG. 11 is a block diagram of structure of a terminal device provided by another exemplary implementation of the present application.

Referring to FIG. 11, FIG. 11 is a schematic diagram of structure of a terminal device provided by an exemplary implementation of the present application. The terminal device includes a processor 11, a receiver 12, a transmitter 13, a storage 14 and a bus 15.

The processor 11 includes one or more processing cores. The processor 11 executes various functional applications and information processing by running software programs and modules.

The receiver 12 and the transmitter 13 may be implemented as a communication component, and the communication component may be a communication chip. The communication chip may include a receiving module, a transmitting module, a modulation and demodulation module, etc., for modulating and/or demodulating information, and receiving or transmitting the information through radio signals.

The storage 14 is connected with the processor 11 via the bus 15.

The storage 14 may be used for storing software programs and modules.

The storage 14 may store at least one application program module 16 for functions described. The application program module 16 may include a determining module 161, a receiving unit 163, and a sending module 162.

The processor 11 is used for executing the determining module 161 to implement the determination acts in the above various method implementations. The processor 11 is used for executing the sending module 162 to implement the sending acts in the above various method implementations. The processor 11 is used for executing the receiving module 163 to implement the receiving acts in the above various method implementations.

In addition, the storage 14 may be implemented by any type of volatile or nonvolatile storage device or a combination thereof, such as a static random access memory (SRAM), an electrically erasable programmable read only memory (EEPROM), an erasable programmable read only memory (EPROM), a programmable read only memory (PROM), a read only memory (ROM), a magnetic memory, a flash memory, a magnetic disk or an optical disk.

Figure 12:
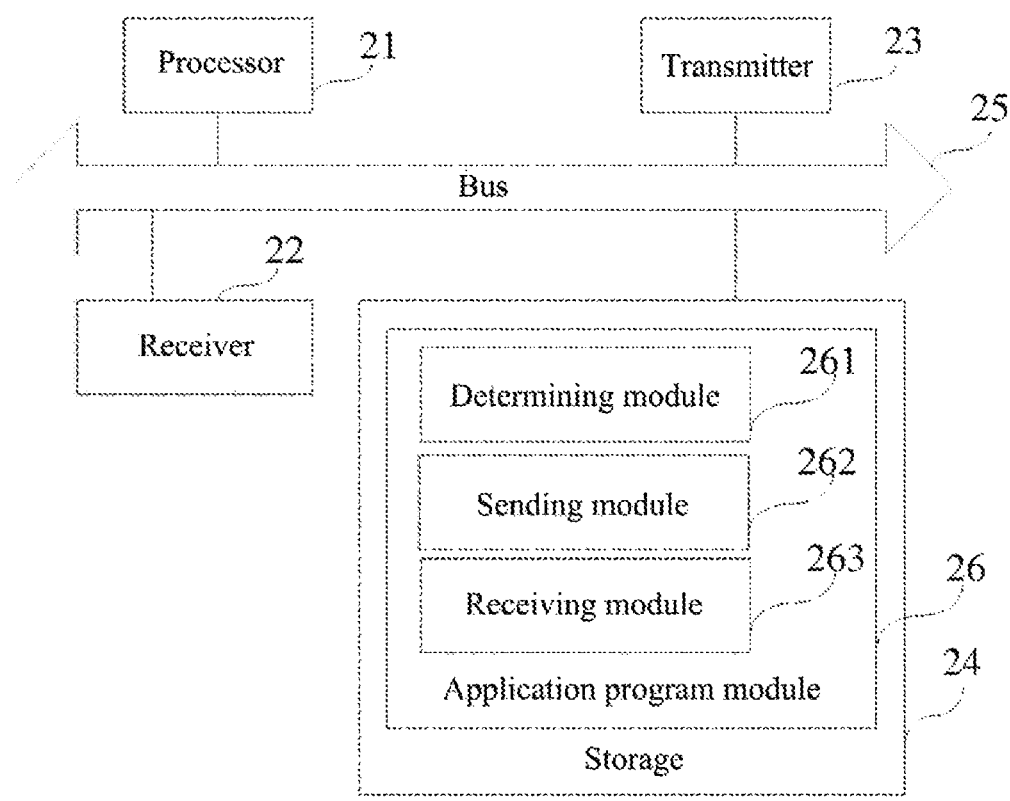
FIG. 12 is a block diagram of structure of an access network device provided by another exemplary implementation of the present application.

Referring to FIG. 12, FIG. 12 is a schematic diagram of structure of an access network device provided by an exemplary implementation of the present application. The access network device includes a processor 21, a receiver 22, a transmitter 23, a storage 24 and a bus 25.

The processor 21 includes one or more processing cores. The processor 21 executes various functional applications and information processing by running software programs and modules.

The receiver 22 and the transmitter 23 may be implemented as a communication component, and the communication component may be a communication chip. The communication chip may include a receiving module, a transmitting module, a modulation and demodulation module, etc. for modulating and demodulating information, and receiving or transmitting the information through radio signals.

The storage 24 is connected with the processor 21 via the bus 25.

The storage 24 may be used for storing software programs and modules.

The storage 24 may store at least one application program module 26 for functions described. The application program module 26 may include a determining module 261, a sending module 262, and a receiving module 263.

The processor 21 is used for executing the receiving module 263 to implement the receiving acts in the above various method implementations. The processor 21 is used for executing the determining module 261 to implement the determination acts in the above various method implementations. The processor 21 is used for executing the transmitting module 262 to implement the sending acts in the above various method implementations.

In addition, the storage 24 may be implemented by any type of volatile or nonvolatile storage device or a combination thereof, such as a static random access memory (SRAM), an electrically erasable programmable read only memory (EEPROM), an erasable programmable read only memory (EPROM), a programmable read only memory (PROM), a read only memory (ROM), a magnetic memory, a flash memory, a magnetic disk or an optical disk.

An implementation of the present application further provides an uplink data system, which may include a terminal device and an access network device.

The terminal device may include the uplink data apparatus provided in the FIG. 9, and the access network device may include the uplink data apparatus provided in the FIG. 10.

Optionally, the terminal device may be the above terminal device provided in FIG. 11, and the access network device may be the above access network device provided in FIG. 12.

Those skilled in the art should appreciate that, in one or more examples described above, the functions described in the implementations of the present application may be implemented by software, hardware, firmware or any combination thereof. When the functions are implemented by using the software, these functions may be stored in a computer readable medium or transmitted as one or more instructions or codes on the computer readable medium. The computer readable medium includes a computer storage medium and a communication medium, wherein the communication medium includes any medium that facilitates the transfer of computer programs from one place to another. The storage medium may be any available medium accessible by a general-purpose computer or a special-purpose computer.

The above description is only the preferred implementations of the present application, and is not intended to limit the present application. Any modification, equivalent substitution, improvement, etc., made within the spirit and principles of the present application shall be included in the scope of protection of the present application.

The invention claimed is:

1. A method for uplink transmission, comprising:
    determining, by a terminal device, at least two resource sets;
    receiving, by the terminal device, a configuration signaling sent by an access network device, wherein the configuration signaling comprises a set index of one or more resource sets of a first category and a set index of one or more resource sets of a second category, and wherein the configuration signaling is determined based on channel condition and a quantity of data to be transmitted of the terminal device;
    determining, by the terminal device, the one or more resource sets of the first category and the one or more resource sets of the second category from the determined at least two resource sets according to the configuration signaling, wherein all resource elements of the one or more resource sets of the first category are used for transmitting uplink control information (UCI) in an uplink control channel, and wherein all resource elements of the one or more resource set of the second category are used for transmitting an uplink demodulation reference signal (DMRS) and a sounding reference signal (SRS); and
    sending, by the terminal device, the uplink control channel, wherein the uplink control channel comprises the UCI,
    wherein frequency domain positions of at least two resource elements in each resource set of the at least two resource sets are different,
    wherein a quantity of the at least two resource sets is determined based on an equation: $P=N*T*B$;
    wherein P is the quantity of the at least two resource sets,
    wherein N is a quantity of symbols comprised in time-frequency resources of the uplink control channel,
    wherein T is a quantity of resource blocks comprised in the time-frequency resources of the uplink control channel, and
    wherein B is a quantity of resource sets of each symbol of each resource block.

2. The method according to claim 1, wherein,
    a length Q of a reference signal sequence used for the DMRS and the SRS is equal to a quantity of resource elements in one resource set of the second category corresponding to the DMRS and the SRS; or,
    a length Q of a reference signal sequence used for the DMRS and the SRS is equal to a quantity of resource elements in a single resource block in one resource set of the second category corresponding to the DMRS and the SRS.

3. The method according to claim 1, wherein,
    resource elements in the each resource set of the at least two resource sets belong to one resource block in frequency domain.

4. The method according to claim 1, wherein,
    resource elements in the each resource set of the at least two resource sets belong to a plurality of resource blocks in frequency domain, and the uplink control channel is transmitted through the plurality of resource blocks.

5. The method according to claim 1, wherein at least one resource set of the first category is used for transmitting the UCI; each resource set of the first category is used for transmitting one UCI modulation symbol; and each UCI modulation symbol, after spreading is performed, is mapped to all resource elements in the at least one resource set of the first category for transmission.

6. The method according to claim 1, wherein the configuration signaling is used for explicitly configuring the one or more resource sets of the second category, and implicitly indicating that the one or more resource sets of the first category is other resource sets except the one or more resource sets of the second category.

7. The method according to claim 1, wherein a mode for establishing a set index of the at least two resource sets comprises one of following:
the at least two resource sets are indexed according to an order of firstly frequency domain and then time domain;
the at least two resource sets are indexed according to an order of firstly time domain and then frequency domain;
the at least two resource sets are indexed in each of resource blocks according to an order of firstly frequency domain and then time domain, and then indexed according to an ascending or descending order of the resource blocks; or
the at least two resource sets are indexed in each of resource blocks according to an order of firstly time domain and then frequency domain, and then indexed according to an ascending or descending order of the resource blocks.

8. An apparatus, comprising:
a processor, used for determining at least two resource sets and for determining one or more resource sets of a first category and one or more resource sets of a second category from the determined at least two resource sets according to a configuration signaling, wherein all resource elements of the one or more resource sets of the first category are used for transmitting uplink control information (UCI) in an uplink control channel, wherein all resource elements of the one or more resource set of the second category are used for transmitting an uplink demodulation reference signal (DMRS) and a sounding reference signal (SRS), wherein frequency domain positions of at least two resource elements in each resource set of the at least two resource sets are different, wherein a quantity of the at least two resource sets is determined based on an equation: $P=N*T*B$, wherein P is the quantity of the at least two resource sets, wherein N is a quantity of symbols comprised in time-frequency resources of the uplink control channel, wherein T is a quantity of resource blocks comprised in the time-frequency resources of the uplink control channel, and wherein B is a quantity of resource sets of each symbol of each resource block;
a receiver, used for receiving the configuration signaling sent by an access network device, wherein the configuration signaling comprises a set index of one or more resource sets of the first category and a set index of one or more resource sets of the second category, and wherein the configuration signaling is determined based on channel condition and a quantity of data to be transmitted of the apparatus; and
a transmitter, used for sending an uplink control channel, wherein the uplink control channel comprises the UCI.

9. The apparatus according to claim 8, wherein,
a length Q of a reference signal sequence used for the DMRS and the SRS is equal to a quantity of resource elements in one resource set of the second category corresponding to the DMRS and the SRS; or,
a length Q of a reference signal sequence used for the DMRS and the SRS is equal to a quantity of resource elements in a single resource block in one resource set of the second category corresponding to the DMRS and the SRS.

10. The apparatus according to claim 8, wherein,
resource elements in the each resource set of the at least two resource sets belong to one resource block in frequency domain.

11. The apparatus according to claim 8, wherein,
resource elements in the each resource set of the at least two resource sets belong to a plurality of resource blocks in frequency domain, and the uplink control channel is transmitted through the plurality of resource blocks.

12. The apparatus according to claim 8, wherein,
resource elements belonging to one time domain symbol in the each resource set of the at least two resource sets are distributed with an equal interval in frequency domain.

13. The apparatus according to claim 8, wherein a mode for establishing a set index of the at least two resource sets comprises one of the following:
the at least two resource sets are indexed according to an order of firstly frequency domain and then time domain;
the at least two resource sets are indexed according to an order of firstly time domain and then frequency domain;
the at least two resource sets are indexed in each of resource blocks according to an order of firstly frequency domain and then time domain, and then indexed according to an ascending or descending order of the resource blocks; or
the at least two resource sets are indexed in each of resource blocks according to an order of firstly time domain and then frequency domain, and then indexed according to an ascending or descending order of the resource blocks.

14. The apparatus according to claim 8, wherein at least one resource set of the first category is used for transmitting the UCI, and each resource set of the first category is used for transmitting one UCI modulation symbol; and
each UCI modulation symbol, after spreading is performed, is mapped to all resource elements in the at least one resource set of the first category for transmission.

15. The apparatus according to claim 8, wherein the configuration signaling is used for explicitly configuring the one or more resource sets of the second category, and implicitly indicating that the one or more resource sets of the first category is other resource sets except the one or more resource sets of the second category.

16. An apparatus, comprising:
a processor, used for determining at least two resource sets, wherein frequency domain positions of at least two resource elements in each resource set of the at least two resource sets are different, wherein a quantity of the at least two resource sets is determined based on an equation: $P=N*T*B$, wherein P is the quantity of the at least two resource sets, wherein N is a quantity of symbols comprised in time-frequency resources of an uplink control channel, wherein T is a quantity of resource blocks comprised in the time-frequency resources of the uplink control channel, and wherein B is a quantity of resource sets of each symbol of each resource block;

a transmitter, used for sending a configuration signaling to a terminal, wherein the configuration signaling is used for configuring one or more resource sets of a first category and one or more resource sets of a second category, wherein the configuration signaling comprises a set index of the one or more resource sets of the first category and a set index of the one or more resource sets of the second category, wherein the configuration signaling is determined based on channel condition and a quantity of data to be transmitted of the terminal, wherein all resource elements of the one or more resource sets of the first category are used for transmitting an uplink control information (UCI) in the uplink control channel, and wherein all resource elements of the one or more resource sets of the second category are used for transmitting an uplink demodulation reference signal (DMRS) and a sounding reference signal (SRS); and a receiver, used for receiving the uplink control channel, wherein the uplink control channel comprises the UCI.

17. The apparatus according to claim 16, wherein a length Q of a reference signal sequence used for the DMRS and the SRS is equal to a quantity of resource elements in one resource set of the second category corresponding to the DMRS and the SRS; or a length Q of a reference signal sequence used for the DMRS and the SRS is equal to a quantity of resource elements in a single resource block in one resource set of the second category corresponding to the DMRS and the SRS.

18. The apparatus according to claim 16, wherein a mode for establishing a set index of the at least two resource sets comprises one of following:

the at least two resource sets are indexed according to an order of firstly frequency domain and then time domain;

the at least two resource sets are indexed according to an order of firstly time domain and then frequency domain;

the at least two resource sets are indexed in each of resource blocks according to an order of firstly frequency domain and then time domain, and then indexed according to an ascending or descending order of the resource blocks; or the at least two resource sets are indexed in each of resource blocks according to an order of firstly time domain and then frequency domain, and then indexed according to an ascending or descending order of the resource blocks.

* * * * *